US008489216B2

(12) United States Patent
Ito et al.

(10) Patent No.: US 8,489,216 B2
(45) Date of Patent: Jul. 16, 2013

(54) SOUND MIXING APPARATUS AND METHOD AND MULTIPOINT CONFERENCE SERVER

(75) Inventors: Hironori Ito, Tokyo (JP); Kazunori Ozawa, Tokyo (JP)

(73) Assignee: NEC Corporation, Tokyo (JP)

( * ) Notice: Subject to any disclaimer, the term of this patent is extended or adjusted under 35 U.S.C. 154(b) by 315 days.

(21) Appl. No.: 12/812,135

(22) PCT Filed: Jan. 28, 2009

(86) PCT No.: PCT/JP2009/051302
§ 371 (c)(1),
(2), (4) Date: Jul. 8, 2010

(87) PCT Pub. No.: WO2009/098975
PCT Pub. Date: Aug. 13, 2009

(65) Prior Publication Data
US 2010/0290645 A1    Nov. 18, 2010

(30) Foreign Application Priority Data
Feb. 4, 2008  (JP) .................................. 2008-023976

(51) Int. Cl.
*G06F 17/00*  (2006.01)
*H04B 1/00*  (2006.01)

(52) U.S. Cl.
USPC ........................................... 700/94; 381/119

(58) Field of Classification Search
USPC .......... 700/94; 704/500–504; 381/119; 369/4
See application file for complete search history.

(56) References Cited

U.S. PATENT DOCUMENTS

| | | | | |
|---|---|---|---|---|
| 5,621,805 A * | 4/1997 | Loh et al. | ........................ | 381/119 |
| 5,647,008 A * | 7/1997 | Farhangi et al. | ............... | 381/119 |
| 5,907,295 A * | 5/1999 | Lin | ................................. | 341/61 |
| 7,369,665 B1 * | 5/2008 | Cheng | ............................ | 381/119 |
| 7,558,637 B2 * | 7/2009 | Takemura et al. | ............... | 700/94 |
| 8,135,483 B2 * | 3/2012 | Miwa | ................................. | 700/94 |
| 2008/0215681 A1 * | 9/2008 | Darcie et al. | .................. | 709/204 |
| 2008/0218586 A1 * | 9/2008 | Graham et al. | ............ | 348/14.09 |

FOREIGN PATENT DOCUMENTS

| | | |
|---|---|---|
| EP | 0605960 A | 7/1994 |
| EP | 1432220 A | 6/2004 |
| JP | 63-314946 A | 12/1988 |
| JP | 10-75310 A | 3/1998 |
| JP | 10-233840 A | 9/1998 |

(Continued)

OTHER PUBLICATIONS

International Search report for PCT/JP2009/051302 mailed Mar. 3, 2009.
Supplementary European Search Report for EP 09 70 9008 issued Dec. 8, 2011.
Y. M. Cheng et al., "Statistical recovery of wideband speech from narrowband speech", IEEE Transactions on Speech and Audio Processing. vol. 2, No. 4, Oct. 1, 1994, XP000874178, pp. 544-548.

*Primary Examiner* — Andrew C Flanders

(57) ABSTRACT

A sound mixing apparatus includes mixing processing units $1_1$ to $1_k$ provided according to sampling frequencies. Each of mixing processing units $1_1$ to $1_k$ adds up input sound signals of the same sampling frequency to generate a first added-up sound signal, converts the sampling frequency of the first added-up sound signal into a sampling frequency processable by the other mixing processing units, and supplies sound signals that are converted to the sampling frequency, to the other mixing processing units, adds up, to generate a second added-up sound signal, the first added-up sound signal generated by itself and the first added-up sound signals that are converted to a sampling frequency processable by itself and that are supplied from the other mixing processing units.

6 Claims, 3 Drawing Sheets

FOREIGN PATENT DOCUMENTS

| | | |
|---|---|---|
| JP | 11-213558 A | 8/1999 |
| JP | 2000069179 A | 3/2000 |
| JP | 2000175170 A | 6/2000 |
| JP | 2004517368 A | 6/2004 |
| JP | 2005020639 A | 1/2005 |
| JP | 2005229259 A | 8/2005 |
| JP | 2006080629 A | 3/2006 |

* cited by examiner

US 8,489,216 B2

SOUND MIXING APPARATUS AND METHOD AND MULTIPOINT CONFERENCE SERVER

This application is the National Phase of PCT/JP2009/051302, filed Jan. 28, 2009, which is based upon and claims the benefit of priority from Japanese Patent Application No. 2008-23976 filed in Japan Patent Office on Feb. 4, 2008, the contents of which are hereby incorporated by reference.

TECHNICAL FIELD

The present invention relates to a technique for mixing plural sound signals, and, more particularly to a mixing technique for sound signals used in a server or the like that provides a multipoint conference service.

BACKGROUND ART

As a system that provides a multipoint conference system, there is a multipoint video conference system disclosed in Japanese Patent Laid-Open No. 2000-175170. This multipoint video conference system includes plural conference terminals and a multipoint control apparatus to which these conference terminals are connected. The conference terminals are allocated to participants.

In this multipoint video conference system, the respective conference terminals transmit acoustic signals concerning sound (speech) detected by the conference terminals to the multipoint control apparatus. The multipoint control apparatus adds up the acoustic signals received from the respective conference terminals. For each of the conference terminals, the multipoint control apparatus subtracts the acoustic signal, which is received from the conference terminal, from the added-up acoustic signal, encodes an acoustic signal obtained as a result of the subtraction, and transmits the encoded acoustic signal to the conference terminal.

The multipoint control apparatus can be applied to various communication networks such as a line switching network, a mobile network, and a packet network. In the line switching network, communication protocols specified by H323 and H.324 of the ITU-T (Telecommunication Union Telecommunication Standardization Sector) recommendation are used. In the mobile network, a communication protocol specified by 3G-324M is used. In the packet network based on the IP (Internet Protocol), RFC3550RTP of the IETF (The Internet Engineering Task Force) is used. "RFC" is an abbreviation of "Request for Comments" and "RTP" is an abbreviation of "Real-time Transport Protocol".

As the multipoint control apparatus, there are a multipoint control apparatus that is mounted with a sound encoder for telephone band sound that has a sampling frequency of 8 kHz and transmits in a 3.4 kHz band and a multipoint control apparatus mounted with a sound encoder for wideband sound that has a sampling frequency of 16 kHz and transmits in a 7 kHz band. As a sound encoder for telephone band sound, a sound encoder of an AMR (Adaptive Multi-Rate) system adopted in G.711, G.729, and 3GPP of the ITU-T recommendation, a sound encoder of an EVRC (Enhanced Variable Rate Codec) system adopted in 3GPP2 of the ITU-T recommendation, and the like are used. As a sound encoder for wideband sound, a sound encoder of an AMR-WB (Wide Band) system specified by G.722 and 3GPP TS26.190 of the ITU-T recommendation is used. It is possible to handle sound signals in a wider band by using the codec of an MPEG-4AAC (Advanced Audio Coding) or the like.

DISCLOSURE OF THE INVENTION

When convenience in using the multipoint conference service is taken into account, it is desirable that the multipoint conference service can be provided among terminals that transmit and receive sound (acoustic) signals in different bands such as a terminal that uses a telephone band and a terminal that uses a wideband.

However, the multipoint control apparatus explained above copes with only sound signals in a single band such as sound signals for telephone band sound or wideband sound. Therefore, it is difficult to provide a multipoint conference service among terminals that transmit and receive sound signals in different bands.

It is an exemplary object of the present invention to solve the problems explained above and to provide a sound mixing apparatus, a sound mixing method, and a multipoint conference server that can mix sound signals in plural bands having different sampling frequencies.

A sound mixing apparatus according to an exemplary aspect of the present invention includes plural mixing processing units provided according to sampling frequencies, wherein each processing unit of the plural mixing processing units adds up input sound signals of a same sampling frequency to generate a first added-up sound signal, converts the sampling frequency of the first added-up sound signal into a sampling frequency processable by the other mixing processing units, supplies sound signals that are converted to the sampling frequency, to the other mixing processing units, and adds up, to generate a second added-up sound signal, the first added-up sound signal generated by itself and the first added-up sound signals that are converted to a sampling frequency processable by itself and that are supplied from the other mixing processing units.

A sound mixing method according to another exemplary aspect of the present invention includes:

a first step of classifying, according to sampling frequencies, plural input sound signals having different sampling frequencies into plural groups;

a second step of adding up, for each of the groups that are classified in the first step, input sound signals of a same sampling frequency to generate a first added-up sound signal, converting the sampling frequency of the first added-up sound signal into a sampling frequency processable in the other groups, and allocating sound signals that are converted to the sampling frequency, to the other groups; and a third step of adding up, for each of the groups that are classified in the first step, the first added-up sound signal generated in the group and the first added-up sound signals that are converted to a sampling frequency processable in the group and that are allocated from the other groups to generate a second added-up sound signal.

A multipoint conference server according to the other exemplary aspect of the present invention connected to plural communication terminals via a network, the multipoint conference server including:

a signal classifier that classifies, according to sampling frequencies, plural sound signals received from the plural communication terminals; and plural mixing processing units provided according to sampling frequencies, wherein each processing unit of the plural mixing processing units adds up input sound signals of a same sampling frequency to generate a first added-up sound signal, converts the sampling frequency of the first added-up sound signal into a sampling frequency processable by the other mixing processing units, supplies sound signals that are converted to the sampling frequency, to the other mixing processing units, and adds up, to generate a second added-up sound signal, the first added-up sound signal generated by itself and the first added-up sound signals that are converted to a sampling frequency processable by itself and that are supplied from the other mixing processing units.

DESCRIPTION OF REFERENCE NUMERALS

| | |
|---|---|
| $1_1$-$1_k$ | Mixing processing unit |
| $10_1$-$10_n$, $20_1$-$20_n$, $30_1$-$30_n$ | Sound signal input terminal |
| $13_1$-$13_k$ | Group signal adder |
| $14_1$-$14_{k-1}$, $12_1$-$12_{k-1}$, $13_1$-$13_{k-1}$ | Sampling converter |
| $15_1$-$15_k$ | All-signal adder |
| $16_1$-$16_n$, $26_1$-$26_n$, $36_1$-$36_n$ | Signal subtracter |
| $17_1$-$17_n$, $27_1$-$27_n$, $37_1$-$37_n$ | Encoder |
| $19_1$-$19_n$, $29_1$-$29_n$, $39_1$-$39_n$ | Sound signal output terminal |

BEST MODE FOR CARRYING OUT THE INVENTION

Next, an exemplary embodiment of the present invention will be described in detail with reference to the drawings.

Figure 1:
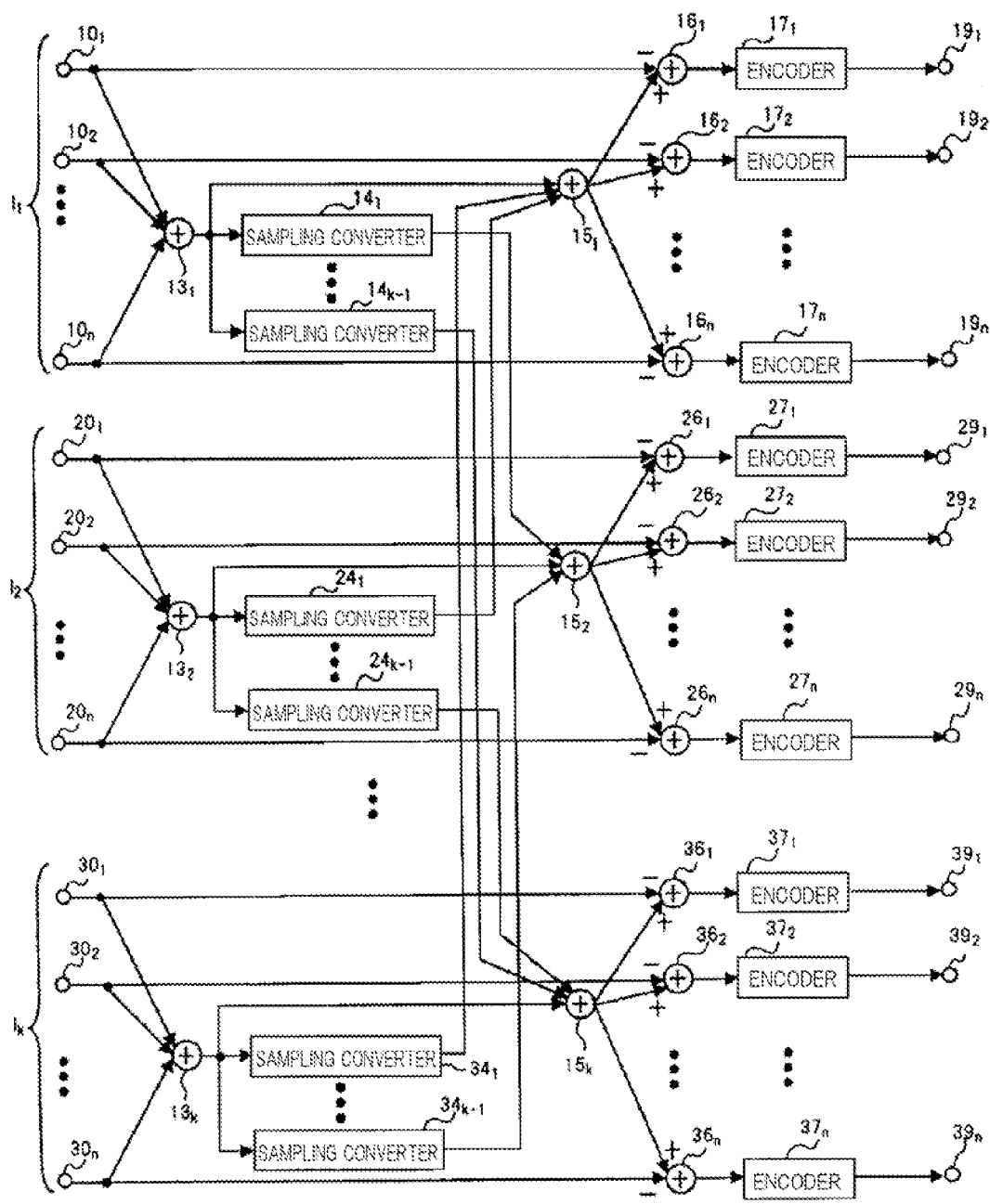
FIG. 1 is a block diagram of a configuration of a sound mixing apparatus according to an exemplary embodiment.

FIG. 1 is a block diagram of a configuration of a sound mixing apparatus according to an exemplary embodiment.

The sound mixing apparatus shown in FIG. 1 is mounted on a multipoint conference server, which is a multipoint control apparatus, and has k mixing processing units $1_1$ to $1_k$. The multipoint conference server is allowed to receive sound signals in plural bands having different sampling frequencies. The mixing processing units are provided for the respective bands. The number of mixing processing units $1_1$ to $1_k$ corresponds to a maximum number of bands that can be handled by the multipoint conference server. The multipoint conference server is configured to receive sound signals in k different bands $B_1$ to $B_k$. The received sound signals are supplied to mixing processing units $1_1$ to $1_k$ provided according to bands.

Before explaining a detailed configuration of the sound mixing apparatus according to this exemplary embodiment, a configuration of the multipoint conference server mounted with the sound mixing apparatus according to this exemplary embodiment will be briefly explained.

Figure 2:
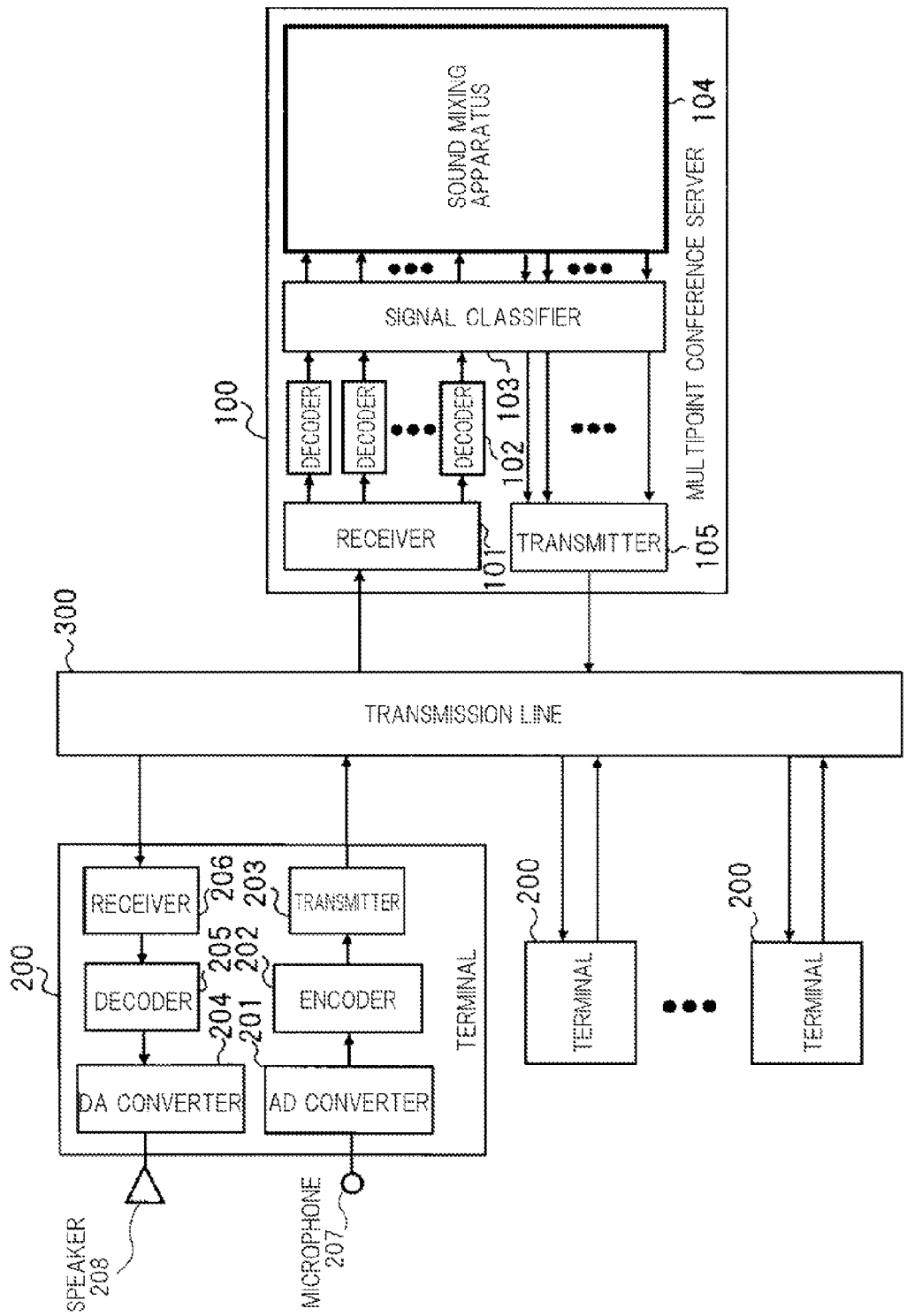
FIG. 2 is a block diagram of a configuration of a multipoint conference system that uses a multipoint conference server mounted with the mixing apparatus shown in FIG. 1.

FIG. 2 is a block diagram of a configuration of a multipoint conference system that uses the multipoint conference server mounted with the sound mixing apparatus shown in FIG. 1. This multipoint conference system includes plural terminals 200 and multipoint conference server 100 to which these terminals 200 are connected via transmission line 300.

Transmission line 300 includes plural communication networks such as a line switching network, a mobile network, and a packet network. When sound signals are transmitted and received between terminals 200 and multipoint conference server 100, call connection information of the sound signals (including address information concerning the terminals that transmit the sound signals, information concerning bands, and information concerning sampling frequencies) is supplied to multipoint conference server 100 through protocols of the respective communication networks.

Plural terminals 200 include plural terminals having different bands and sampling frequencies of sound signals transmitted and received via transmission line 300. For example, a terminal for telephone band sound that has a sampling frequency of 8 kHz and transmits in a 3.4 kHz band and a terminal for wideband sound that has a sampling frequency of 16 kHz and transmits in a 7 kHz band are used as terminals 200. Configurations of terminals 200 are basically the same.

Each of terminals 200 includes AD converter 201, encoder 202, transmitter 203, DA converter 204, decoder 205, and receiver 206.

AD converter 201 converts a sound signal (an analog signal) from microphone 207 into a digital signal. Encoder 202 encodes the sound signal (the digital signal) supplied from AD converter 201. Transmitter 203 transmits the encoded sound signal, which is supplied from encoder 202, to multipoint conference server 100 via transmission line 300.

Receiver 206 receives the encoded sound signal (the digital signal) from multipoint conference server 100 via transmission line 300. Decoder 205 decodes the encoded sound signal supplied from receiver 206. DA converter 204 converts the decoded sound signal (the digital signal) from decoder 205 into an analog signal. The sound signal converted into the analog signal is supplied from DA converter 204 to speaker 208.

Multipoint conference server 100 includes receiver 101, plural decoders 102, signal classifier 103, sound mixing apparatus 104, and transmitter 105. Sound mixing apparatus 104 is the sound mixing apparatus shown in FIG. 1.

Receiver 101 receives a sound signal from each of terminals 200 via transmission line 300. The received sound signal is supplied from receiver 101 to any one of plural decoders 102. Decoder 102 decodes the sound signal supplied from receiver 101. The decoded sound signal is supplied from decoder 102 to signal classifier 103.

Signal classifier 103 supplies, according to the sampling frequency of the decoded sound signal supplied from decoder 102, the decoded sound signal to a mixing processing unit corresponding to the decoded sound signal among mixing processing units $1_1$ to $1_k$ shown in FIG. 1. Signal classifier 103 supplies the sound signal, which is supplied from sound mixing apparatus 104, to transmitter 105. The sampling frequency of the decoded sound signal can be obtained from call control information obtained when receiver 101 receives the sound signal.

Transmitter 105 transmits the sound signal, which is supplied from signal classifier 103, to a corresponding terminal among plural terminals 200 via transmission line 300. A terminal as a transmission destination can be identified on the basis of call control information obtained when receiver 101 receives the sound signal.

Sound mixing apparatus 104 mixes and encodes plural sound signals classified according to sampling frequencies, which are supplied from signal classifier 103, and supplies the encoded sound signals to signal classifier 103.

A configuration of sound mixing apparatus 104 is specifically explained with reference to FIG. 1.

Sound mixing apparatus 104 includes mixing processing units $1_1$ to $1_k$. Mixing processing units $1_1$ to $1_k$ basically have the same configuration. For convenience of explanation, specific configurations concerning mixing processing unit $1_1$, mixing processing unit $1_2$, and mixing processing unit $1_k$ are shown in FIG. 1.

[Configuration of Mixing Processing Unit $1_1$]

Mixing processing unit $1_1$ includes sound-signal input terminals $10_1$ to $10_n$, group signal adder $13_1$, sampling converters $14_1$ to $14_{k-1}$, all-signal adder $15_1$, signal subtracters $16_1$ to $16_n$, encoders $17_1$ to $17_n$, and sound-signal output terminals $19_1$ to $19_n$.

Sound signals in band $B_1$ are allocated to sound-signal input terminals $10_1$ to $10_n$. For example, when n sound signals are received as sound signals in band $B_1$, received sound signals are supplied to each of sound-signal input terminals $10_1$ to $10_n$.

A sound signal from sound-signal input terminal $10_1$ is supplied to a first input section of signal subtracter $16_1$ and supplied to group signal adder $13_1$. Similarly, sound signals from sound-signal input terminals $10_2$ to $10_n$ are supplied to the first input sections of signal subtracters $16_2$ to $16_n$ and supplied to group signal adder $13_1$.

Group signal adder $13_1$ adds up the sound signals from sound-signal input terminals $10_1$ to $10_n$ and outputs a result of the addition. Output of group signal adder $13_1$ is supplied to sampling converters $14_1$ to $14_{k-1}$ and all-signal adder $15_1$.

Sampling converters $14_1$ to $14_k$ are provided in association with the other bands $B_2$ to $B_k$ excluding band $B_1$. Sampling converter $14_1$ converts a sampling frequency of a sound signal (the addition result) supplied from group signal adder $13_1$ such that the sampling frequency coincides with the sampling frequency of a sound signal in band $B_2$. For example, when a sampling frequency of the sound signal in band $B_1$ is 8 kHz and a sampling frequency of the sound signal in band $B_2$ is 16 kHz, sampling converter $14_1$ converts the sampling frequency of the sound signal from group signal adder $13_1$ from 8 kHz to 16 kHz. Similarly, each converter of sampling converters $14_2$ to $14_{k-1}$ converts the sampling frequency of the sound signal from group signal adder $13_1$ into a sampling frequency of a sound signal in a band corresponding to the converter.

An output of sampling converter $14_1$ is supplied to the all-signal adder of mixing processing unit $1_2$ corresponding to band $B_2$. Similarly, outputs of sampling converters $14_2$ to $14_{k-1}$ are supplied to the all-signal adders of mixing processing units $1_3$ to $1_k$ corresponding to bands $B_3$ to $B_k$.

All-signal adder $15_1$ receives the sound signal from group signal adder $13_1$ and receives sound signals from the group signal adders of the other mixing processing units $1_2$ to $1_k$ as inputs and adds up these input sound signals. The output of all-signal adder $15_1$ is supplied to signal subtracters $16_1$ to $16_n$.

Signal subtracter $16_1$ receives a sound signal from sound-signal input terminal $10_1$ as a first input, receives a sound signal from all-signal adder $15_1$ as a second input, and outputs a sound signal obtained by subtracting the first input from the second input. The output of signal subtracter $16_1$ is supplied to encoder $17_1$. Similarly, each of signal subtracters $16_2$ to $16_n$ receives a sound signal from an input terminal corresponding thereto among sound-signal input terminals $10_2$ to $10_n$ as a first input, receives a sound signal from all-signal adder $15_1$ as a second input, and outputs a sound signal obtained by subtracting the first input from the second input. Outputs from signal subtracters $16_2$ to $16_n$ are supplied to encoders $17_2$ to $17_n$.

Encoder $17_1$ encodes a sound signal from signal subtracter $16_1$. Similarly, encoders $17_2$ to $17_n$ encode sound signals from signal subtracters corresponding thereto among signal subtracters $16_2$ to $16_n$. Outputs of encoders $17_1$ to $17_n$ are supplied to sound-signal output terminals $19_1$ to $19_n$. Sound-signal output terminals $19_1$ to $19_n$ supply the inputted sound signals to signal classifier 103 shown in FIG. 2.

[Configuration of Mixing Processing Unit $1_2$]

Mixing processing unit $1_2$ includes sound-signal input terminals $20_1$ to $20_n$, group signal adder $13_2$, sampling converters $24_1$ to $24_{10}$, all-signal adder $15_2$, signal subtracters $26_1$ to $26_n$, encoders $27_1$ to $27_n$, and sound-signal output terminals $29_1$ to $29_n$.

Sound signals in band $B_2$ are allocated to sound-signal input terminals $20_1$ to $20_n$. The number of sound-signal input terminals $20_1$ to $20_n$ may be the same as or different from the number of sound-signal input terminals of the other mixing processing units.

A sound signal from sound-signal input terminal $20_1$ is supplied to a first input section of signal subtracter $26_1$ and is supplied to group signal adder $13_2$. Similarly, sound signals from sound-signal input terminals $20_2$ to $20_n$ are supplied to first input sections of signal subtracters $26_2$ to $26_n$ and are supplied to group signal adder $13_2$.

Group signal adder $13_2$ adds up the sound signals from sound-signal input terminals $20_1$ to $20_n$ and outputs the result of the addition. The output of group signal adder $13_2$ is supplied to sampling converters $24_1$ to $24_{k-1}$ and all-signal adder $15_2$.

Sampling converters $24_1$ to $24_{k-1}$ are provided in association with the other bands $B_1$ and $B_3$ to $B_k$ excluding band $B_2$. Sampling converter $24_1$ converts the sampling frequency of a sound signal (the addition result) supplied from group signal adder $13_2$ such that the sampling frequency coincides with a sampling frequency of the sound signal in band $B_1$. Similarly, each converter of sampling converters $24_2$ to $24_{k-1}$ converts the sampling frequency of the sound signal from group signal adder $13_2$ into a sampling frequency of a sound signal in a band corresponding to the converter.

The output of sampling converter $24_1$ is supplied to the all-signal adder of mixing processing unit $1_1$ corresponding to band $B_1$. Similarly, outputs of sampling converters $24_2$ to $24_{k-1}$ are supplied to the all-signal adders of mixing processing units $1_3$ to $1_k$ corresponding to bands $B_3$ to $B_k$.

All-signal adder $15_2$ receives a sound signal from group signal adder $13_2$ and sound signals from the group signal adders of the other mixing processing units $1_1$ and $1_3$ to $1_k$ as inputs and adds up these input sound signals. An output of all-signal adder $15_2$ is supplied to signal subtracters $26_1$ to $26_n$.

Signal subtracter $26_1$ receives a sound signal from sound-signal input terminal $20_1$ as a first input, receives a sound signal from all-signal adder $15_2$ as a second input, and outputs a sound signal obtained by subtracting the first input from the second input. The output of signal subtracter $26_1$ is supplied to encoder $27_1$. Similarly, each of signal subtracters $26_2$ to $26_n$ receives a sound signal from a sound-signal input terminal corresponding thereto among sound-signal input terminals $20_2$ to $20_n$ as a first input, and a sound signal from all-signal adder $15_2$ as a second input, and outputs a sound signal obtained by subtracting the first input from the second input. Outputs of signal subtracters $26_2$ to $26_n$ are supplied to encoders $27_2$ to $27_n$.

Encoder $27_1$ encodes the sound signal from signal subtracter $26_1$. Similarly, encoders $27_2$ to $27_n$ encode sound signals from the signal subtracters corresponding thereto among signal subtracters $26_2$ to $26_n$. Outputs of encoders $27_1$ to $27_n$ are supplied to sound-signal output terminals $29_1$ to $29_n$. Sound-signal output terminals $29_1$ to $29_n$ supply inputted sound signals to signal classifier 103 shown in FIG. 2.

[Configuration of Mixing Processing Unit $1_k$]

Mixing processing unit $1_k$ includes sound-signal input terminals $30_1$ to $30_n$, group signal adder $13_k$, sampling converters $34_1$ to $34_{k-1}$, all-signal adder $15_k$, signal subtracters $36_1$ to $36_n$, encoders $37_1$ to $37_n$ and sound-signal output terminals $39_1$ to $39_n$.

Sound signals in band $B_k$ are allocated to sound-signal input terminals $30_1$ to $30_n$. The number of sound-signal input terminals $30_1$ to $30_n$ may be the same as or different from the number of sound-signal input terminals of the other mixing processing units.

A sound signal from sound-signal input terminal $30_1$ is supplied to a first input section of signal subtracter $36_1$ and is supplied to group signal adder $13_k$. Similarly, sound signals from sound-signal input terminals $30_2$ to $30_n$ are supplied to first input sections of signal subtracters $36_2$ to $36_n$ and are supplied to group signal adder $13_k$.

Group signal adder $13_k$ adds up the sound signals from sound-signal input terminals $30_1$ to $30_n$ and outputs the result of the addition. The output of group signal adder $13_k$ is supplied to sampling converters $34_1$ to $34_{k-1}$ and all-signal adder $15_k$.

Sampling converters $34_1$ to $34_{k-1}$ are provided in association with the other bands $B_1$ to $B_{k-1}$ excluding band $B_k$. Sampling converter $34_1$ converts a sampling frequency of a sound signal (the addition result) supplied from group signal adder $13_k$ such that the sampling frequency coincides with the sampling frequency of the sound signal in band $B_1$. Similarly, each converter of sampling converters $34_2$ to $34_{k-1}$ converts the sampling frequency of the sound signal from group signal adder $13_k$ into a sampling frequency of a sound signal in a band corresponding to the converter.

An output of sampling converter $34_1$ is supplied to the all-signal adder of mixing processing unit $1_1$ corresponding to band $B_1$. Similarly, outputs of sampling converters $34_2$ to $34_{k-1}$ are supplied to the all-signal adders of mixing processing units $1_1$ to $1_{k-1}$ corresponding to bands $B_1$ to $B_{k-1}$.

All-signal adder $15_k$ receives a sound signal from group signal adder $13_k$ and receives sound signals from the group signal adders of the other mixing processing units $1_1$ to $1_{k-1}$ as inputs and adds up these input sound signals. An output of all-signal adder $15_k$ is supplied to signal subtracters $36_1$ to $36_n$.

Signal subtracter $36_1$ receives a sound signal from sound-signal input terminal $30_1$ as a first input, receives a sound signal from all-signal adder $15_k$ as a second input, and outputs a sound signal obtained by subtracting the first input from the second input. Similarly, each of signal subtracters $36_2$ to $36_n$ receives a sound-signal input terminal corresponding thereto among sound-signal input terminals $30_2$ to $30_n$ as a first input, and each of signal subtracters $36_2$ to $36_n$ receives a sound signal from all-signal adder $15_k$ as a second input, and outputs a sound signal obtained by subtracting the first input from the second input. Outputs of signal subtracters $36_1$ to $36_n$ are supplied to encoders $37_1$ to $37_n$.

Encoder $37_1$ encodes the sound signal from signal subtracter $36_1$. Similarly, encoders $37_2$ to $37_n$ encode sound signals from the signal subtracters corresponding thereto among signal subtracters $36_2$ to $36_n$. Outputs of encoders $37_1$ to $37_n$ are supplied to sound-signal output terminals $39_1$ to $39_n$. Sound signals inputted to sound-signal output terminals $39_1$ to $39_n$ are supplied to signal classifier 103 shown in FIG. 2.

Configurations of the other mixing processing units $1_3$ to $1_{k-1}$ are basically the same as mixing processing units $1_1$, $1_2$, and $1_k$ explained above.

Operations of the sound mixing apparatus according to this exemplary embodiment are explained in detail below.

Figure 3:
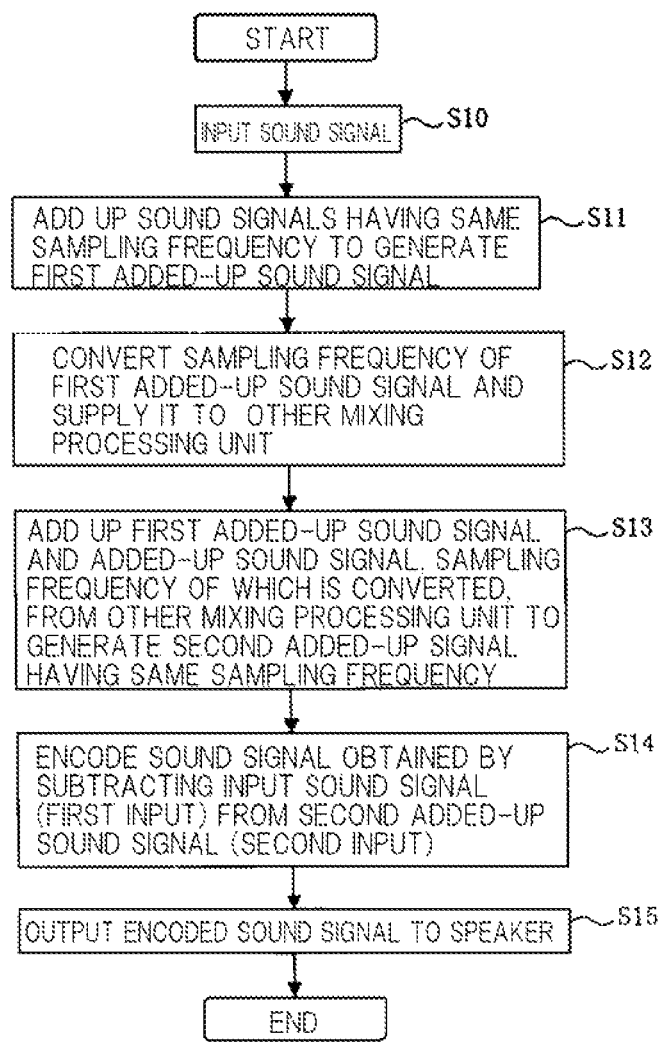
FIG. 3 is a flowchart of a procedure of mixing processing by the sound mixing apparatus shown in FIG. 1.

FIG. 3 is a flowchart of a procedure of mixing processing by the sound mixing apparatus shown in FIG. 1.

Operations of mixing processing units to $1_k$ are basically the same. Operations of mixing processing unit $1_1$ performed when signal classifier 103 shown in FIG. 2 supplies sound signals in bands $B_1$ to $B_k$ to mixing processing units $1_1$ to $1_k$ are explained with reference to FIGS. 1 and 3. Sampling frequencies of the sound signals in bands $B_1$ to $B_k$ are sampling frequencies $F_1$ to $F_k$, respectively.

As sound signals in bands $B_1$, plural sound signals $S_1$ to $S_n$ having sampling frequency $F_1$ are supplied to sound-signal input terminals $10_1$ to $10_n$ (step S10). Sound signals $S_1$ to $S_n$ from sound-signal input terminals $10_1$ to $10_n$ are supplied to the first input sections of signal subtracters $16_1$ to $16_n$ and are supplied to the first input section of group signal adder $13_1$.

Group signal adder $13_1$ adds up sound signals $S_1$ to $S_n$ from sound-signal input terminals $10_1$ to $10_n$ to generate a first added-up sound signal (step S11). The first added-up sound signal is supplied to sampling converter $14_1$ to $14_{k-1}$ and to all-signal adder $15_1$.

Sampling converter $14_1$ converts sampling frequency $F_1$ of the first added-up sound signal in the same band supplied from group signal adder $13_1$ into sampling frequency $F_2$. Similarly, sampling converters $14_2$ to $14_{k-1}$ convert sampling frequency $F_1$ of the first added-up sound signal in the same band supplied from group signal adder $13_1$ into a corresponding sampling frequency among sampling frequencies $F_3$ to $F_k$. The first added-up sound signals in the same band, the sampling frequencies of which are converted into sampling frequencies in the other bands by sampling converters $14_1$ to $14_{k-1}$, are supplied to all-signal adders $15_2$ to $15_k$ of the other mixing processing units $1_2$ to $1_k$ (step S12).

All-signal adder $15_1$ adds up the first added-up sound signal in the same band supplied from group signal adder $13_1$ and the other first added-up sound signals in the same band, the sampling frequencies of which are converted, from the other mixing processing units $1_2$ to $1_k$ and outputs a second added-up sound signal having the same sampling frequency $F_1$ (step S13). The second added-up sound signal having the same sampling frequency $F_1$ outputted from all-signal adder $15_1$ is supplied to signal subtracters $16_1$ to $16_n$.

Signal subtracter $16_1$ outputs a sound signal obtained by subtracting the input sound signal (a first input), which is supplied from sound-signal input terminal $10_1$, from the second added-up sound signal (a second input), which is supplied from all-signal adder $15_1$. Encoder $17_1$ encodes the sound signal outputted from signal subtracter $16_1$. Similarly, each of signal subtracters $16_2$ to $16_n$ outputs a sound signal obtained by subtracting the sound signals (first inputs), which are supplied from corresponding input terminals among sound signal input terminals $10_2$ to $10_n$, from the second added-up sound signal (the second input), which is supplied from all-signal adder $15_1$. Encoders $17_2$ to $17_n$ encode the sound signals from signal subtracters $16_2$ to $16_n$ (step S14).

Outputs of encoders $17_1$ to $17_n$ are supplied to signal classifier 103 shown in FIG. 2 via sound-signal output terminals $19_2$ to $19_n$ (step S15).

In the other mixing processing units $1_2$ to $1_k$, sound mixing processing is performed according to the same procedure as steps S10 to S15.

Operations of the respective mixing processing units of the sound mixing apparatus according to this exemplary embodiment will be explained with reference to specific numerical values of sampling frequencies.

Plural terminals 200 shown in FIG. 2 include a first terminal group that transmits and receives a sound signal having a sampling frequency of 8 kHz (e.g., sound data of the G.729 system and the AMR system), a second terminal group that transmits and receives a sound signal having a sampling frequency of 16 kHz (e.g., sound data of the G.722 system and the AMR-WB system), and a third terminal group that transits and receives a sound signal having a sampling frequency of 32 kHz (e.g., sound data of the AAC system).

The sound signal from the first terminal group is supplied to mixing processing unit $1_1$, the sound signal from the second terminal group is supplied to mixing processing unit $1_2$, and the sound signal from the third terminal group is supplied to mixing processing unit $1_3$.

In mixing processing unit mixing processing for the sound signal from the first terminal group is performed according to the procedure shown in FIG. 3. In this mixing processing, sampling converter $14_1$ converts a sampling frequency of 8 kHz of an added-up sound signal in the same band from group signal adder $13_1$ into a sampling frequency of 16 kHz processable by mixing processing unit $1_2$.

In up-sampling conversion from a sampling frequency of 8 kHz to a sampling frequency of 16 kHz, for example, one sample having a value 0 is inserted between samples of the sound signal having the frequency of 8 kHz, whereby a sound signal having a double number of samples is generated. The generated sound signal is passed through a band limiting filter that only allows the transmission of bands that are equal to or lower than a frequency of 4 kHz, whereby a sound signal having the sampling frequency of 16 kHz is obtained.

Sampling converter $14_2$ converts the sampling frequency of 8 kHz of the added-up sound signal in the same band from group signal adder $13_1$ into a sampling frequency of 32 kHz processable by mixing processing unit $1_3$.

In up-sampling conversion from a sampling frequency of 8 kHz to a sampling frequency of 32 kHz, for example, three samples having a value 0 are inserted between samples of the sound signal having a frequency of 8 kHz, whereby a sound signal having a quadruple number of samples is generated. The generated sound signal is passed through a band limiting filter that only allows the transmission of bands that are equal to or lower than a frequency of 4 kHz, whereby a sound signal having the sampling frequency of 32 kHz is obtained.

Concerning details of the sampling conversion, for example, a document "J. O. Smith, "A Flexible Sampling-Rate Conversion Method," Proc. IEEEICASSP '84 Vol. 9, Part 1, pp. 112 to 115" can be referred to.

When the up-sampling conversion is performed, in order to prevent a sense of hearing discomfort caused by mixing sound signals in different bands, for example, band expansion processing for adding a pseudo signal to a high frequency band may be applied. Concerning details of the band expansion processing, for example, a document "Yan Ming Cheng, O'Shaughnessy and D. Mermelstein, "Statistical Recovery of Wideband Speech from Narrowband speech," Speech and Audio Processing, IEEE Transactions on Volume 2, Issue 4, October 1994 pp. 544 to 548" can be referred to.

Also in mixing processing unit $1_2$, mixing processing for the sound signal from the second terminal group is performed according to the procedure shown in FIG. 3. In this mixing processing, sampling converter $24_1$ converts a sampling frequency of 16 kHz of an added-up sound signal in the same band from group signal adder $13_2$ into a sampling frequency of 8 kHz processable by mixing processing unit $1_1$.

In down-sampling conversion from a sampling frequency of 16 kHz to a sampling frequency of 8 kHz, for example, after a sound signal having a sampling frequency of 16 kHz is passed through a band limiting filter that only allows the transmission of bands that are equal to or lower than a frequency of 4 kHz, data of the sound signal is thinned out for every other sample, whereby a sound signal having the sampling frequency of 8 kHz is obtained.

Sampling converter $24_2$ converts the sampling frequency of 16 kHz of the added-up sound signal in the same band from group signal adder $13_2$ into a sampling frequency of 32 kHz processable by mixing processing unit $1_3$.

In up-sampling conversion from a sampling frequency of 16 kHz to a sampling frequency of 32 kHz, for example, one sample having a value 0 is inserted between samples of the sound signal having a frequency of 16 kHz, whereby a sound signal having a double number of samples is generated. The generated sound signal is passed through a band limiting filter that only allows the transmission of bands that are equal to or lower than a frequency of 8 kHz, whereby a sound signal having the sampling frequency of 32 kHz is obtained.

Also in mixing processing unit $1_3$, mixing processing for the sound signal from the third terminal group is performed according to the procedure shown in FIG. 3. In this mixing processing, sampling converter $34_1$ converts a sampling frequency of 32 kHz of an added-up sound signal in the same band from group signal adder $13_3$ into a sampling frequency of 8 kHz processable by mixing processing unit $1_1$.

In down-sampling conversion from a sampling frequency of 32 kHz to a sampling frequency of 8 kHz, for example, after a sound signal having a sampling frequency of 32 kHz is passed through a band limiting filter that only allows the transmission of bands that are equal to or lower than a frequency of 4 kHz, data of the sound signal is thinned out for every three samples, whereby a sound signal having a sampling frequency of 8 kHz is obtained.

Sampling converter $34_2$ converts the sampling frequency of 32 kHz of the added-up sound signal in the same band from group signal adder $13_2$ into a sampling frequency of 16 kHz processable by mixing processing unit $1_2$.

In down-sampling conversion from a sampling frequency of 32 kHz to a sampling frequency of 16 kHz, for example, after a sound signal having a sampling frequency of 32 kHz is passed through a band limiting filter that only allows the transmission of bands that are equal to or lower than a frequency of 8 kHz, data of the sound signal is thinned out for every other sample, whereby a sound signal having a sampling frequency of 16 kHz is obtained.

According to the conversion processing for a sampling frequency explained above, in each processing unit of the mixing processing units provided according to bands, a sound signal supplied to the processing unit can be mixed with sound signals supplied to the other mixing processing units.

As explained above, in the sound mixing apparatus according to this exemplary embodiment, each of mixing processing units $1_1$ to $1_k$ converts a sampling frequency of an inputted added-up sound signal in the same band into a sampling frequency processable by the other mixing processing units. Moreover, each processing unit of mixing processing units $1_1$ to $1_k$ adds, to generate an added-up signal having the same sampling frequency, an added-up sound signal in the same band generated by itself to added-up sound signals in the same band whose sampling frequencies are converted into a sampling frequency processable by itself and which are supplied from the other mixing processing unit. Each of mixing processing units $1_1$ to $1_k$ subtracts an input sound signal from the added-up signal having the same sampling frequency and encodes a sound signal obtained as a result of the subtraction.

According to the configuration explained above, each processing unit of mixing processing units $1_1$ to $1_k$ can mix sound signals in plural different bands by converting a sampling frequency of an added-up sound signal in the same band into a sampling frequency processable by the other mixing processing units and by adding up an added-up sound signal in the same band generated by itself and added-up sound signals in the same band whose sampling frequencies are converted into a sampling frequency processable by itself and which are supplied from the other mixing processing unit. Therefore, for example, it is possible to provide a multipoint conference service between terminals that transmit and receive sound signals in different bands such as a terminal that uses a telephone band and a terminal that uses a wideband.

When each processing unit of mixing processing units $1_1$ to $1_k$ adds up an added-up sound signal in the same band generated by the processing unit and added-up sound signals in the same band, and whose sampling frequencies are converted into a sampling frequency of the processing unit and which are supplied from the other mixing processing units, the processing unit may add a pseudo sound signal having a high-frequency component set in advance to the added-up signal. This makes it possible to prevent, when the up-sampling conversion is performed, a sense of hearing discomfort caused by mixing sound signals in different bands and to improve the sound quality of a signal having a low sampling frequency.

The sound mixing apparatus according to this exemplary embodiment is an example of the present invention. It is possible to appropriately change a configuration and operations thereof without departing from the spirit of the present invention.

For example, in the sound mixing apparatus shown in FIG. 1, mixing processing units $1_1$ to $1_k$ may use, as output signals thereof, sound signals outputted from all-signal adders $15_1$ to $15_k$ or sound data obtained by encoding the output sound signals.

In the sound mixing apparatus shown in FIG. 1, the encoders (e.g., encoders $17_1$ to $17_k$, $27_1$ to $27_k$, and $37_1$ to $37_k$) of mixing processing units $1_1$ to $1_k$ may be prediction encoders.

In the configuration shown in FIGS. 1 and 2, the decoders and the signal classifiers may be provided in the sound mixing apparatus or may be provided in the receiver.

The multipoint conference server shown in FIG. 2 can be realized by a computer system that operates according to a program. A main part of this computer system includes a storage device that accumulates programs, data, and the like, input devices such as a keyboard and a mouse, a display device such as an LCD (Liquid Crystal Display), a communication device such as a modem that communicates with the outside, an output device such as a printer, and a control device (CPU: Central Processing Unit) that operates according to the programs stored in the storage device, receives an input from the input device, and controls operations of the communication device, the output device, and the display device. As a program that can be used, a program for causing the CPU to execute the mixing processing shown in FIG. 3 is stored in the storage device. This program may be provided through a recording medium or the Internet. As a program that can be used, a program for causing a DSP (Digital Signal Processor) to execute the mixing processing shown in FIG. 3 can also be provided.

According to the present invention as explained above, since it is possible to perform sound mixing for mixing sound signals in plural bands having different sampling frequencies, it is possible to provide a multipoint conference service between terminals that transmit and receive a sound (speech) signal in different bands such as a terminal that uses a telephone band and a terminal that uses a wideband. Therefore, it is possible to realize improvement of convenience in a multipoint sound conference service.

The present invention can be applied to apparatuses in general that perform sound mixing besides the system that provides the multipoint conference service. For example, the present invention can be applied to a system that provides various media services. The system is realized by an MRF (Media Resource Function) specified by 3GPP and an MRCF (Media Resource Control Function) corresponding to the call control unit. The MRF and the MRCF are used to realize a function of a so-called multipoint control apparatus (MCU: Multi-Point Control Unit) of the multipoint conference system.

Although the present invention has been described with reference to an exemplary embodiment, the present invention is not limited to the above-described exemplary embodiment. The configuration and operation of the present invention is open to various modifications within a scope that does not depart from the spirit of the present invention that will be understood by one of ordinary skill in the art.

The invention claimed is:

1. A sound mixing apparatus comprising plural mixing processing units provided according to sampling frequencies, wherein
    each processing unit of the plural mixing processing units comprises a central processing unit and a memory, which:
    adds up input sound signals of a same sampling frequency to generate a first added-up sound signal, converts the sampling frequency of the first added-up sound signal into a sampling frequency processable by the other mixing processing units, supplies sound signals that are converted to the sampling frequency, to the other mixing processing units, and adds up, to generate a second added-up sound signal, the first added-up sound signal generated by itself and the first added-up sound signals that are converted to a sampling frequency processable by itself and that are supplied from the other mixing processing units,
    wherein each processing unit of the plural mixing processing units generates, for each of the input sound signals having the same sampling frequency, a subtracted sound signal obtained by subtracting the input sound signal from the second added-up sound signal and encodes the subtracted sound signal.

2. The sound mixing apparatus according to claim 1, wherein each processing unit of the plural mixing processing units adds a pseudo sound signal having a high-frequency component set in advance to the second added-up sound signal.

3. The sound mixing apparatus according to claim 2, wherein each processing unit of the plural mixing processing units comprises:
    a group-signal adder that adds up input sound signals having the same sampling frequency to generate the first added-up sound signal;
    an all-signal adder that adds up, to generate the second added-up sound signal, the first added-up sound signal generated by the group signal adder and the first added-up sound signal that are converted to a sampling frequency processable by the processing unit and that are supplied from the other mixing processing units;
    plural signal subtracters that are provided for each of the input sound signals having the same sampling frequency, receive supply of the input sound signal as a first input, receive supply of the second added-up sound signal, which is generated by the all-signal adder, as a second input, and subtract the first input from the second input; and
    plural encoders that respectively encode sound signals outputted from the plural signal subtracters.

4. The sound mixing apparatus according to claim 1, wherein each processing unit of the plural mixing processing units includes:
- a group-signal adder that adds up input sound signals having the same sampling frequency to generate the first added-up sound signal;
- an all-signal adder that adds up, to generate the second added-up sound signal, the first added-up sound signal generated by the group signal adder and the first added-up sound signal that are converted to a sampling frequency processable by the processing unit and that are supplied from the other mixing processing units;
- plural signal subtracters that are provided for each of the input sound signals having the same sampling frequency, receive supply of the input sound signal as a first input, receive supply of the second added-up sound signal, which is generated by the all-signal adder, as a second input, and subtract the first input from the second input; and
- plural encoders that respectively encode sound signals outputted from the plural signal subtracters.

5. A sound mixing method comprising:
- classifying, according to sampling frequencies, plural input sound signals having different sampling frequencies into plural groups;
- adding up, for each of the groups that are classified, input sound signals of a same sampling frequency to generate a first added-up sound signal, converting the sampling frequency of the first added-up sound signal into a sampling frequency processable in the other groups, and allocating sound signals that are converted to the sampling frequency, to the other groups;
- adding up, for each of the groups that are classified, the first added-up sound signal generated in the group and the first added-up sound signals that are converted to a sampling frequency processable in the group and that are allocated from the other groups to generate a second added-up sound signal; and
- generating, in each of the groups that are classified, for each of the input sound input signals having the same sampling frequency, a subtracted sound signal obtained by subtracting the input sound signal from the second added-up sound signal and encoding the subtracted sound signal.

6. The sound mixing method according to claim 5, further comprising adding, in each of the groups that are classified, a pseudo sound signal having a high-frequency component set in advance to the second added-up sound signal.

* * * * *